May 22, 1956 H. M. JENKINS, JR 2,746,806
WHEEL TRIM STRUCTURE
Filed Jan. 29, 1953 2 Sheets-Sheet 1
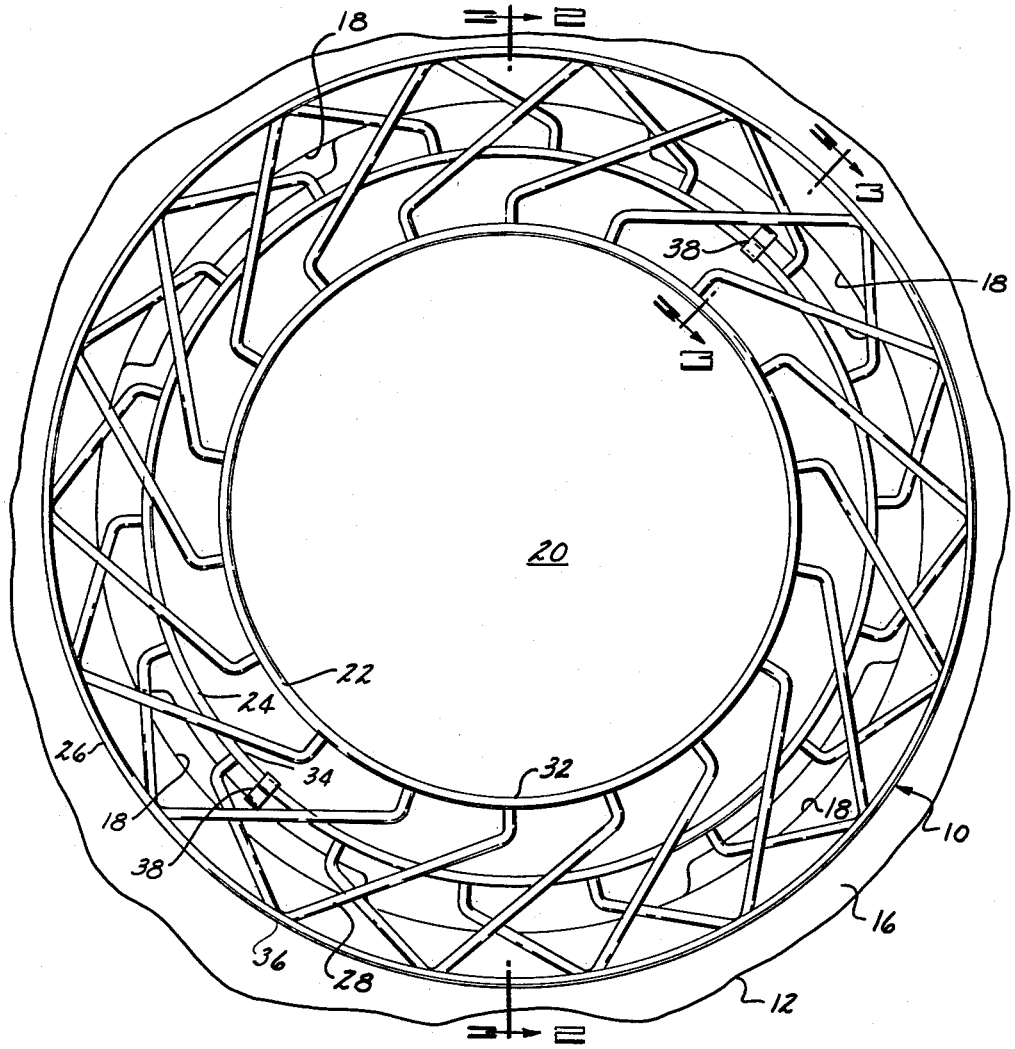
INVENTOR.
HOWARD M. JENKINS JR.
BY
Smith and Olsen
ATTORNEYS May 22, 1956 H. M. JENKINS, JR 2,746,806
WHEEL TRIM STRUCTURE
Filed Jan. 29, 1953 2 Sheets-Sheet 2
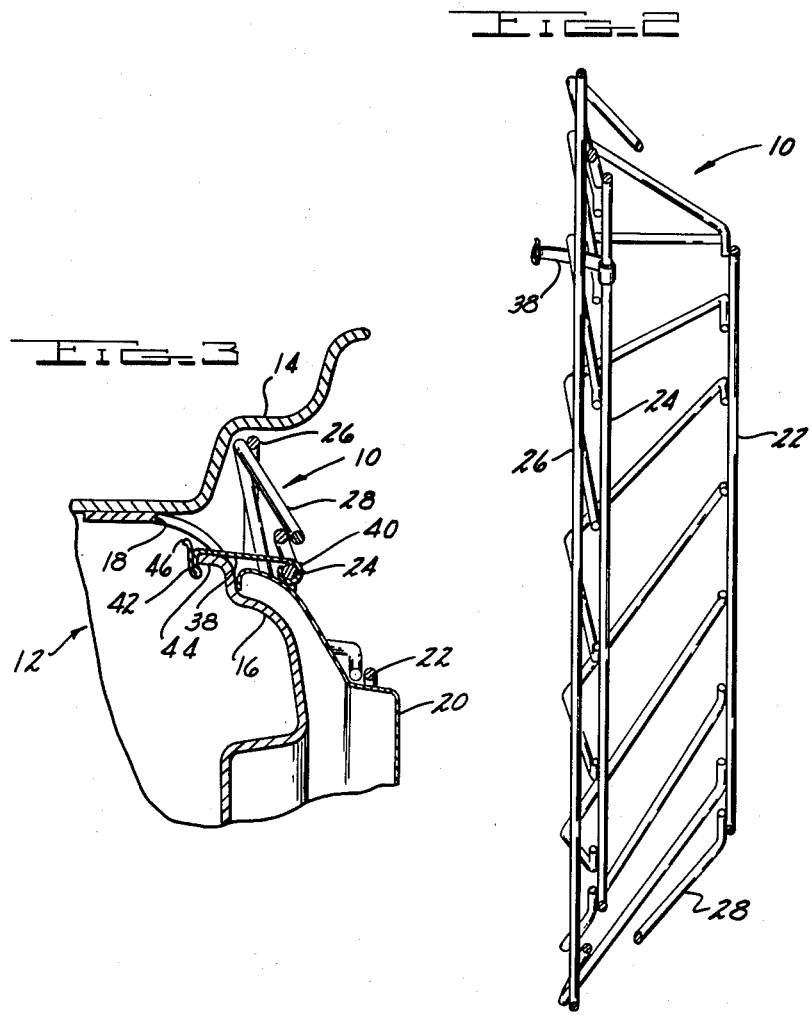
INVENTOR.
HOWARD M. JENKINS JR.
BY
Smith and Olsen
ATTORNEY

United States Patent Office 2,746,806
Patented May 22, 1956

2,746,806

WHEEL TRIM STRUCTURE

Howard M. Jenkins, Jr., Detroit, Mich., assignor to Van Auken, Inc., Detroit, Mich., a corporation of Michigan Application January 29, 1953, Serial No. 333,863

4 Claims. (Cl. 301—37)

The present invention relates to a wheel trim member for a vehicle wheel, and more particularly to an annulus adapted to be disposed between the rim and hub of an automobile wheel to simulate a wire wheel construction and to the snap-on clips for holding such annulus on the wheel.

It is the primary object of the present invention to provide a wheel trim member which may be easily snapped onto a conventional automobile wheel assembly and which is formed from wire elements which simulate wire wheel spokes, said wire elements being shaped to facilitate manufacturing the trim member.

It is another object of the present invention to provide a wheel trim member of the foregoing character which has spring clips for attaching it to the wheel so that it will be disposed between the rim and hub cap of the wheel assembly.

It is still another object of the present invention to provide a wheel trim member simulating the spoke construction of a wire wheel, said trim member being constructed and arranged so that it can be secured in position without requiring any modification or change in the conventional wheel assembly.

It is still another object of the present invention to provide a wheel trim member simulating the spoke construction of a wire wheel, said trim member being constructed and arranged to be disposed between rim and hub cap portions of the wheel assembly and so that it will not impede the circulation of air through the wheel assembly.

It is still another object of the present invention to provide a spring clip for use in attaching a wheel trim member to a conventional automobile wheel, said spring clip being constructed and arranged so that it can securely attach the trim member to the wheel by a simple snap-on action.

Other objects of this invention will appear in the following description and appended claims, reference being had to the accompanying drawings forming a part of this specification wherein like reference characters designate corresponding parts in the several views.

In the drawings:

Fig. 1 is a front elevation of a wheel trim member embodying the present invention;

Fig. 2 is a sectional view taken on the line 2—2 of Fig. 1; and

Fig. 3 is an enlarged fragmentary view taken on the line 3—3 of Fig. 1 showing one of the spring clips used to attach the trim member to the wheel assembly.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings for a more detailed description, one embodiment of the invention can be seen. The annulus or wheel trim member 10 is mounted on a conventional automobile wheel 12. The latter includes the rim portion 14 and the wheel body portion or spider 16 which has the usual spaced ventilation openings 18 between the areas of attachment to the rim. Secured by any well known means (not shown) to the front side of the wheel 12 is a hub cap 20. The wheel 12 and the hub cap 20 are well known constructions in the automobile industry and the specific details shown in the drawings form no part of the present invention. It is to be understood that any conventional wheel and hub cap construction may be used with this invention.

The ornamental wire annulus 10 includes three wire rings 22, 24 and 26 which are connected by a plurality of wire elements 28. Each of the wire elements 28 are similarly constructed and arranged and only one of such elements will be described. Each wire element 28, Fig. 1, is V-shaped with one end being connected to the ring 22 as at 32, and the other end being connected to the ring 24 as at 34. The lower end of the V-shaped element is connected to the ring 26 as at 36. These connections may be made in any suitable manner such as by brazing or welding. It will be noted that the ends of the wire elements 28 are bent radially inwardly. This is done to facilitate the assembly of the wheel trim member 10 and to improve its general appearance.

The wheel trim member 10 is attached to and held in place on the wheel assembly by a plurality of spring clips 38. Each spring clip has a loop 40 at its one end so that it is hingedly connected to the ring 24 as can best be seen in Fig. 3. The other end of each spring clip 38 has a folded over portion 42 which is adapted to be snapped over the flange 44 forming the inner edge of a ventilation opening 18. Only two such spring clips 38 are shown, but it is to be understood that any greater number may be employed.

From the foregoing description it can be seen that the wheel trim member 10 can easily be attached to any conventional wheel assembly without requiring any modification or change in the construction of such assembly. Also, it can be attached directly to the wheel assembly without removing any of the parts thereof. This is easily accomplished merely by placing the trim member 10 concentrically over the hub cap 20 into engagement with the hub cap 20 and the rim portion 14. Each of the spring clips 38 is then swung into one of the ventilation openings 18, and the folded over portion 42 is snapped over the flange 44 locking the wheel trim member 10 in place. To remove the trim member it is only necessary to pull on the outer end 46 of each spring clip thereby unsnapping the same.

Thus, it can be seen that a very simple wheel trim member has been provided which can be disposed between the rim and hub cap of a wheel assembly to simulate a wire wheel construction. This trim member can be easily attached to and removed from new or used wheel asemblies, and when in use will not materially impede flow of air around the wheel for ventilating the same.

Having thus described my invention, I claim:

1. As an article of manufacture, an automobile wheel trim member for disposition between the rim and hub cap of a wheel assembly comprising an outer ring adapted to seat on a portion of the wheel rim, and a pair of radially spaced inner wire rings adapted to seat on the outer surface of the wheel hub cap, a plurality of spoke-like elements connecting the outer ring with each of the inner wire rings, said spoke-like elements being V-shaped with the base of the V being attached to the outer ring and the end portions being attached respectively to each of the inner rings, said end portions being bent substantially radially inwardly adjacent their points of attachment with the inner rings and a plurality of spring clips hingedly mounted on the outwardly spaced inner ring having end portions adapted to be snapped onto portions of the wheel for holding the trim member in place.

2. In combination with a hub cap and a wheel having a rim portion and a body portion with spaced ventilation openings, a spoke-like wheel trim member comprising an outer ring seated on said rim portion, a pair of radially spaced inner rings seated on the axially outer surface of said hub cap, a plurality of spoke-like elements connecting the outer ring with each of the inner rings, and a plurality of spring clips hingedly connected to one of said rings and extending into said ventilation openings where they are in snap-on engagement with the edges of such openings for holding the trim member between the hub cap and wheel rim portion.

3. In a spoke-like wheel trim member formed solely from wire elements and adapted to be disposed between the hub and rim parts of a wheel, a spring clip having a loop on its one end for attachment to a wire portion of the trim member and a resilient bent-over portion at its other end for a snap-on attachment to the wheel.

4. In a spoke-like wheel trim member formed from wire elements and adapted to be disposed between the hub and rim parts of a wheel, a spring clip having a loop on its one end for hinge-like attachment to a wire portion of the trim member and a resilient bent-over portion adjacent its other end for a snap-on attachment to the wheel, said bent over portion having its extreme end reversed upon itself and extending in the opposite direction for disengaging said clip from the wheel.

References Cited in the file of this patent

UNITED STATES PATENTS

| | | |
|---|---|---|
| D. 167,801 | McLeod | Sept. 23, 1952 |
| 2,127,220 | Horn | Aug. 16, 1938 |
| 2,279,331 | Lyon | Apr. 14, 1942 |
| 2,699,360 | Jenkins | Jan. 11, 1955 |

FOREIGN PATENTS

| | | |
|---|---|---|
| 714,587 | France | Sept. 7, 1931 |